Jan. 22, 1929.
R. P. LANSING
1,699,703
VEHICLE SPRING CONTROLLER
Original Filed Dec. 22, 1925
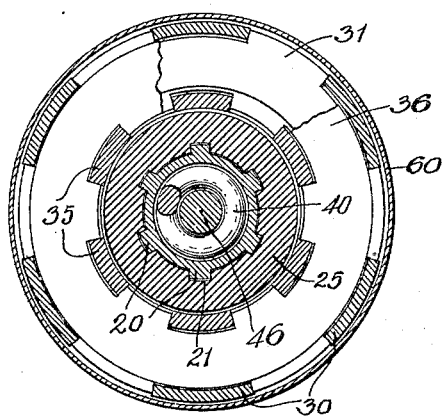
Fig.3,
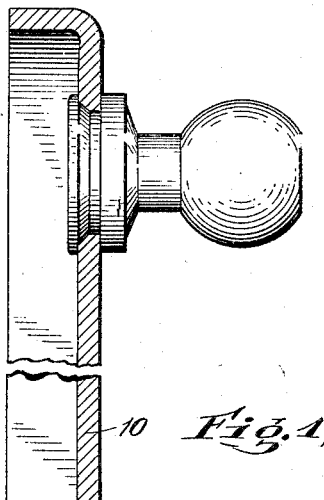
Fig.4,
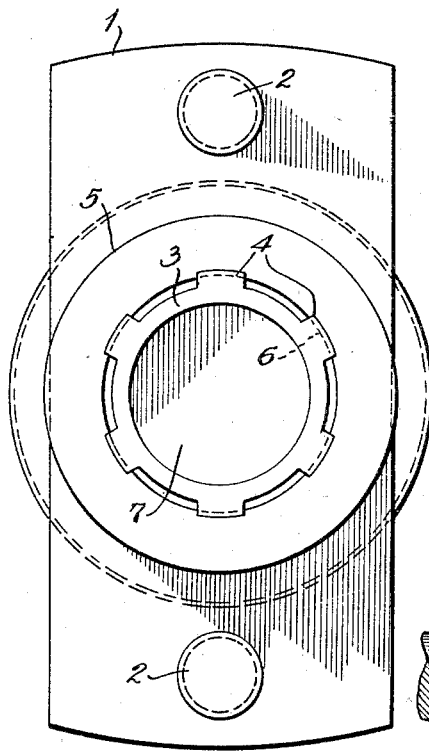
Fig.2,
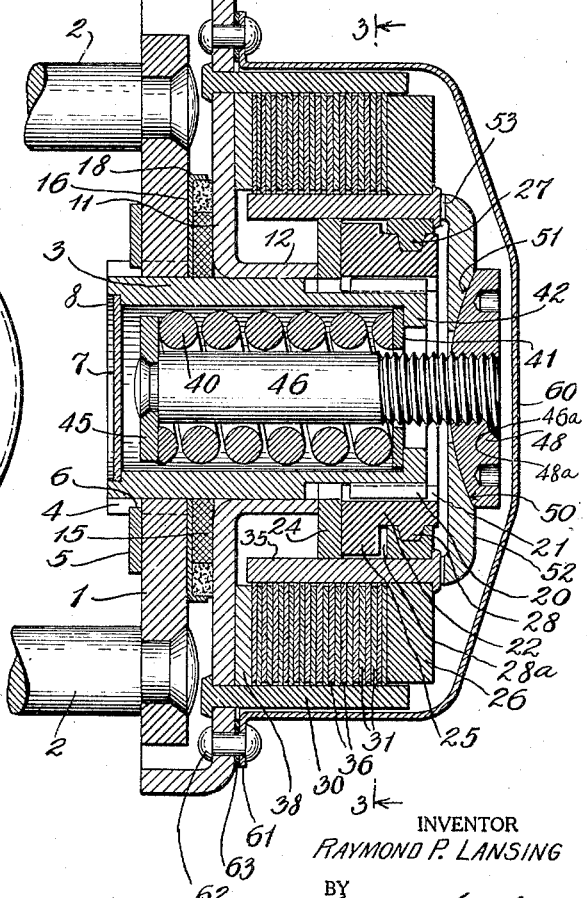
INVENTOR
RAYMOND P. LANSING
BY
Dempster M. Smith
ATTORNEY Patented Jan. 22, 1929.

1,699,703

UNITED STATES PATENT OFFICE.

RAYMOND P. LANSING, OF MONTCLAIR, NEW JERSEY.

VEHICLE SPRING CONTROLLER.

Application filed December 22, 1925, Serial No. 77,024. Renewed April 9, 1928.

The invention relates to vehicle spring controllers or "shock absorbers" of the friction type.

The general object is to provide a compact and durable structure of such design that it may be produced at moderate cost, which has an ample total friction surface to produce the desired effects with reasonable spring pressure, and which has certain operative features and advantages sufficiently pointed out in the detail description.

A more particular object is to make the appliance more compact, and especially to reduce the axial length of the main part of the structure which includes the active mechanism.

Another object is to improve the mechanical organization of appliances of this character in various ways, as sufficiently pointed out hereafter.

The characteristics and advantages of the invention are further sufficiently explained in connection with the following detail description of the accompanying drawings, which shows one representative embodiment of the invention. After considering this example, skilled persons will understand that many variations may be made, and I contemplate the employment of any structures that are properly within the scope of the appended claims.

In the drawings:

Fig. 1 is a horizontal section (with reference to the usual location in a vehicle) of mechanism embodying the invention in one form.

Fig. 2 is an elevation, looking toward the inner face of the base plate.

Fig. 3 is a composite, vertical transverse section, with parts broken away in various parallel planes.

The main or base plate 1 is arranged for connection, by stud bolts 2 or otherwise, to a vehicle member such as the vertical web of a side frame member. A tubular spindle 3 is secured at the center of the base plate. Desirably, the spindle has splines 4 engaging co-operating formations in the base plate to prevent rotation, and is retained against endwise displacement by a locking washer 5 engaging grooves 6 cut in the splines 4. Desirably the inward end of the spindle bore is closed by a thin plate 7, pressed or sprung into a shallow counterbore 8.

A lever or arm 10 which is desirably of pressed sheet metal has a hub portion 11 surrounding the spindle, and at the center of this portion is an outward projecting bearing sleeve 12 having a rotative bearing fit on the spindle. To take up inward thrust of the arm, a bearing ring 15 is interposed between the base plate and the arm plate 11. This ring may be of a suitable bearing metal such as bronze, and is also of moderate average radius, so that the friction effect at this bearing is small or negligible. If, however, it is desired to provide appreciable friction at this point, the bearing ring 15 may be of other material, such as asbestos fabric or composition. To provide a seal at this thrust bearing, in order to retain lubricant and exclude dirt and moisture, a washer cup 16 of thin sheet metal is placed between bearing ring 15 and the base plate 1. This cup has a shallow cylindrical periphery 17 to retain a compressible washer 18, of felt or other suitable material, in close contact with the inner face of arm plate 11 and the periphery of the bearing disc 15.

At its outer end the spindle is provided with external, longitudinal splines 20 co-operating with internal splines 21 formed in a screw member 22, which is conveniently identified in some cases as an actuator. The inward end of the actuator confronts or co-operates with the outward end of arm sleeve 12 with or without an interposed spacing washer 24. The inward portion of the actuator is formed with a peripheral flange 25. A pressure plate 26 co-operates with the actuator by means of internal screw threads 27 engaging external threads 28 on the actuator. Actuator flange 25 confronts the inner face of the pressure plate, and outward movement of the actuator is limited by the flange striking the plate. The amount of rotary and longitudinal travel is represented by the clearance at $28^a$.

Arm plate 11 is provided with a spaced series of cylindrical segments 30 which engage notches in the peripheries of a set of friction discs 31, which may be identified as rotary discs, since they always move with the arm. The pressure plate has an annularly spaced series of cylindrical segments 35 engaging notches in the inner peripheries of other friction discs 36 interspaced with discs 31. The discs 36 always move with the pressure plate, but are sometimes held stationary while the arm and the other discs 31 rotate, to produce the maximum frictional effect. Desirably, a spacing washer 38 is located on arm plate 11 to space the innermost disc outward beyond the inner ends of segments 35.

A helical spring 40 is located within the spindle with its outer end bearing against a washer 41, which in turn engages an inturned flange 42 at the outer end of the spindle. The inner end of the spring bears against a disc or washer 45 carried by a bolt 46, the outer, threaded end of which is engaged by a nut 48 which also serves as a flexible bearing member. For this purpose the inner face of the nut is formed with a part spherical surface 50 engaging a concave spherical surface 51 in a plate 52, which has at its periphery inwardly presented notches 53 engaging the heads of segments 35, or is otherwise irrevolubly connected to the pressure plate 26.

The entire outward portion of the mechanism, including the discs, pressure plate, actuator, etc., are enclosed by a cover 60 of pressed sheet metal having a flange 61 secured to arm plate portion 11 by screws or rivets 62, with an interposed gasket 63 to insure a tight seal. The housing thus provided excludes dirt and moisture and retains suitable quantity of a lubricant, which in addition to its lubricating function serves as a cushion between relatively moving parts and substantially or entirely eliminates noticeable noise.

When the appliance is assembled, as shown in Fig. 1, the adjustment nut 48 is turned in, thus moving bolt 46 outward and placing spring 40 under initial compression to the desired extent, and this adjustment is fixed by suitable means such as slot 48$^a$ into which a small part of the metal end of the spindle may be peened, as at 46$^a$. The spring pressure reacting against spindle flange 42 and acting through the bolt, nut 48, plate 52, and pressure plate 26, normally holds all the friction disc surfaces in frictional engagement so that plate 52, the pressure plate, discs and arm 10 tend to turn together, plate 52 rotating with relation to nut 48 at the bearing surfaces 50 and 51. The spring also holds the entire rotary structure against outward displacement and retains the inner face of arm plate portion 11 in contact with the bearing ring 15. The spherical bearing engagement of nut 48 with connecting plate 52 also permits more or less angular deflection of bolt 46 and thus accommodates any slight displacements caused by the spring action, or otherwise in a flexible manner, without imposing any undesired strains on other parts of the mechanism, and without interfering with the smooth rotation of the rotary parts.

The appliance may be arranged to oppose the greatest frictional resistance either to vehicle spring compression or recoil. It is usually considered advisable to apply the greatest resistance to recoil and therefore in the following operative explanation it will be understood that the appliance is so arranged. When the screw threads 27, 28, have a right hand lead, counter clockwise movement of arm 10, as viewed in Fig. 2, or from the left in Fig. 1, corresponds to the vehicle spring recoil in which the axle moves away from the vehicle frame or body.

When the road wheel of the vehicle strikes an obstruction causing an upward axle movement and vehicle spring compression, arm 10 moves clockwise. All of the friction discs, the pressure plate, and plate 52 rotate along with the arm without resistance other than the bearing friction at the thrust bearing 15 and the surfaces 50 and 51. If the actuator or shifter 22 has been previously displaced outward, the screw thread action during the stated arm movement moves the shifter inward, producing a clearance at 28$^a$, and increasing this clearance until the inward end of the actuator strikes washer 24 or the outer end of sleeve 12. Inward movement of the shifter is thus stopped and the shifter being held irrevoluble by its spline connection with the spindle, if the arm movement continues, the screw thread reaction causes the pressure plate 26 to move outward slightly, so that the spring pressure applied to the discs is substantially relaxed and a reduced frictional retarding effect is applied to the axle during the remainder of the stated vehicle spring compression movement. If a spring recoil follows immediately, as it usually does, in the first small arc of movement of arm 10, the pressure plate turns along with the arm and the friction discs, and this movement is facilitated by the spring pressure and the screw action. Full contact is thus restored between the pressure plate and the discs.

If the recoil movement continues the discs, pressure plate and connecting plate 52 continue to rotate with the arm without resistance other than bearing friction, through a moderate arc of rotation, proportional to the amount of normal clearance at 28$^a$. During this movement the actuator or shifter moves outward freely and without effect until flange 25 strikes the inner face of the pressure plate and thereupon locks the pressure plate against further rotation. During the remainder of the recoil movement all of the disc surfaces slip and the normal or maximum friction resistance proportional to the pressure of spring 40 and the total friction area is applied to resist or check the recoil.

The substantially free angle of movement of the actuator or shifter, represented by the clearance at 28$^a$, provides a substantially free range or period of arm movement so that in running over smooth roads there is no interference with the normal vehicle spring action.

By the described arrangement of the pressure spring within a hollow spindle, the overall axial length of the appliance is kept within very moderate limits.

The screw threads connecting the actuator and pressure plate broadly represent any suitable means for producing an axial travel by rotary motion. For instance, these screw threads represent one form of cam. Therefore when reference is made to a screw action or screw threads, these words are not intended to have a necessarily limiting significance.

I claim:

1. An appliance of the class described, comprising a base, a relatively rotary structure including an arm, friction means and a pressure-transfer member, yieldable pressure producing means normally stressed to apply pressure to said pressure-transfer member, and an actuator held against rotation and arranged for axial movement and co-operating with said member to produce slipping resistance in one direction of arm rotation, and to relax the pressure effect and frictional resistance in the other direction of rotation.

2. An appliance of the class described, comprising a base, a relatively rotary structure including an arm, friction means and a pressure member, a spring normally stressed to apply pressure to said pressure member and friction means, and an actuator arranged for axial movement and held against rotation and having screw cooperation with said pressure member to produce frictional slippage of the friction members in one direction of arm rotation, and to relax the spring pressure and reduce the friction effect in the other direction of rotation.

3. An appliance of the class described, comprising a base, a relatively rotary structure including an arm, friction means and a pressure member, a spring normally stressed to apply pressure to said pressure member and friction means, and an actuator arranged for axial movement and held against rotation and having screw co-operating with said pressure member, and locking means to produce frictional slippage of the friction means in one direction of arm rotation, said screw-cooperation serving to relax the spring pressure and reduce the friction effect in the other direction of rotation.

4. An appliance of the class described, comprising a base, a relatively rotary structure including an arm, friction means and a pressure member, a spring normally stressed to apply pressure to said pressure member and friction means, and an actuator arranged for axial movement and held against rotation and having a screw co-operation with said pressure member to produce frictional slippage of the friction members in one direction of arm rotation, to relax the spring pressure and reduce the friction effect in the other direction of rotation and a thrust bearing between the base and said rotary structure supporting the latter against thrust produced by the spring.

5. An appliance of the class described, comprising a base, a relatively rotary structure including an arm, friction means and a pressure member, a spring normally stressed to apply pressure to said pressure member and friction means, and an actuator arranged for axial movement and held against rotation and having screw co-operation with said pressure member, and means for limiting travel of the actuator to cause frictional slippage at a certain point in rotary travel of the arm in one direction.

6. An appliance of the class described, comprising a base, a spindle projecting therefrom, an actuator having a spline connection with the spindle to permit axial movement and prevent rotation, an arm rotatable about the spindle, a pressure plate having screw co-operation with the actuator, friction means between the pressure plate and arm, and a spring normally stressed to apply pressure through the pressure plate to the friction means.

7. An appliance of the class described, comprising a base, a spindle projecting therefrom, an actuator having a spline connection with the spindle to permit axial movement and prevent rotation, an arm rotatable about the spindle, a pressure plate having screw co-operation with the actuator, friction means between the pressure plate and arm, and a spring normally stressed to apply pressure through the pressure plate to the friction means, the actuator and pressure plate having co-operative means to limit relative movement of the actuator in one direction.

8. An appliance of the class described, comprising a base, a hollow spindle projecting therefrom, an arm arranged for rotation about the spindle, an actuator having a spline connection with the spindle to permit axial movement and prevent rotation, a pressure plate having screw cooperation with the actuator, friction means between the pressure plate and arm, a spring located within the spindle, and means normally communicating the spring pressure to the pressure plate and friction means.

9. An appliance of the class described, comprising a base, a hollow spindle projecting therefrom, an arm arranged for rotation about the spindle, an actuator having a spline connection with the spindle to permit axial movement and prevent rotation, a pressure plate having screw co-operation with the actuator, friction means between the pressure plate and arm, a spring located within the spindle, one end of the spring bearing against an abutment in fixed relation to the spindle, an abutment for the other end of the spring, and a connection from the last named abutment to normally apply spring pressure to the pressure plate and friction means.

10. An appliance of the class described, comprising a base, a hollow spindle projecting therefrom, an arm arranged for rotation about the spindle, an actuator having a spline connection with the spindle to permit axial movement and prevent rotation, a pressure plate having screw co-operation with the actuator, friction means between the pressure plate and arm, a spring located within the spindle, one end of the spring bearing against an abutment in fixed relation to the spindle, and means for transferring pressure exerted at the other end of the spring to the pressure plate and friction means, said pressure transferring means including a flexible bearing connection to permit moderate angular dislocation and rotation of the pressure plate and related parts.

11. An appliance of the class described, comprising a base, a hollow spindle projecting therefrom, an arm arranged for rotation about the spindle, an actuator having a spline connection with the spindle to permit axial movement and prevent rotation, a pressure plate having screw co-operation with the actuator, friction means between the pressure plate and arm, a spring located within the spindle, one end of the spring bearing against an abutment in fixed relation to the spindle, an abutment for the other end of the spring, a bolt connected to said abutment and extending through the spring, a nut connected to the bolt, a pressure-transfer member acting on the pressure plate, and a flexible bearing connection between the nut and said pressure-transfer member.

12. An appliance of the class described, comprising a base, a hollow spindle projecting therefrom, an arm arranged for rotation about the spindle, an actuator having a spline connection with the spindle to permit axial movement and prevent rotation, a pressure plate having screw co-operation with the actuator, friction means between the pressure plate and arm, a spring located within the spindle, one end of the spring bearing against an abutment in fixed relation to the spindle, an abutment for the other end of the spring, a bolt connected to said abutment and extending through the spring, a nut connected to the bolt, and a pressure-transfer plate bearing on the pressure plate, the pressure-transfer plate and nut having co-operating, substantially spherical surfaces to provide a flexible rotary bearing.

Signed at Hoboken, in the county of Hudson and State of New Jersey, this seventh day of December, A. D. 1925.

RAYMOND P. LANSING.